No. 661,411. Patented Nov. 6, 1900.
H. LONITZ.
TWO PART FLOWER POT.
(Application filed Mar. 6, 1900.)
(No Model.)

Witnesses:
Geo. W. Rea.
W. Lee Helms.

Inventor:
Hugo Lonitz
By James L. Norris.
Atty.

United States Patent Office.

HUGO LONITZ, OF NEUHALDENSLEBEN, GERMANY.

TWO-PART FLOWER-POT.

SPECIFICATION forming part of Letters Patent No. 661,411, dated November 6, 1900.

Application filed March 6, 1900. Serial No. 7,555. (No model.)

*To all whom it may concern:*

Be it known that I, HUGO LONITZ, manufacturer, a subject of the King of Prussia, Emperor of Germany, residing at Neuhaldensleben, in the Kingdom of Prussia, German Empire, have invented certain new and useful Improvements in Two-Part Flower-Pots, of which the following is a specification.

My invention relates to a flower-pot differing from the known two-part flower-pots in that the airing or aeration may be suspended according to requirements. This effect is obtained by providing one pot with recesses into which fit corresponding ribs or projections on the other pot.

Figure 1:
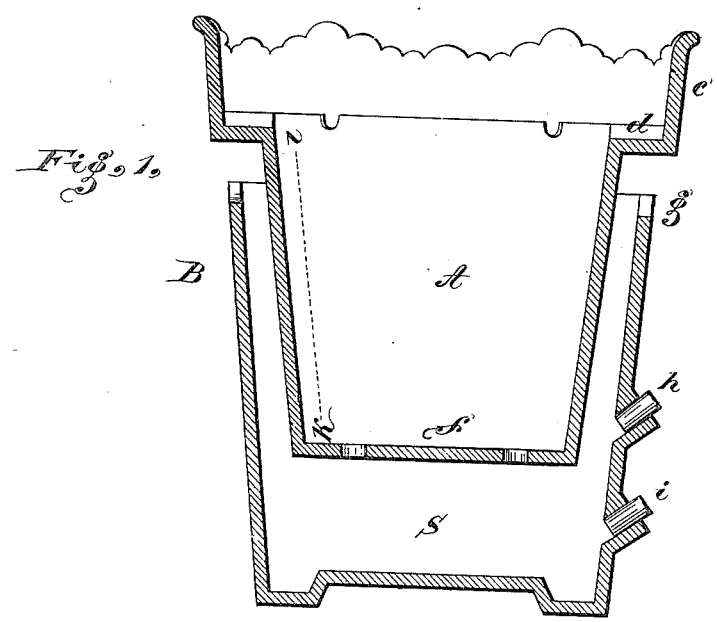
Figure 2:
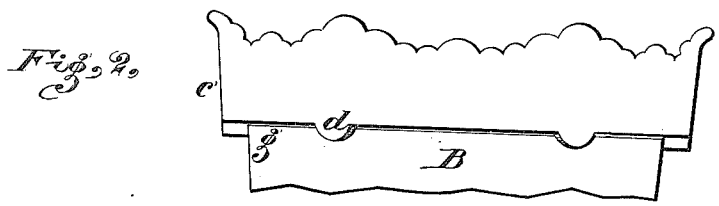
Figure 3:
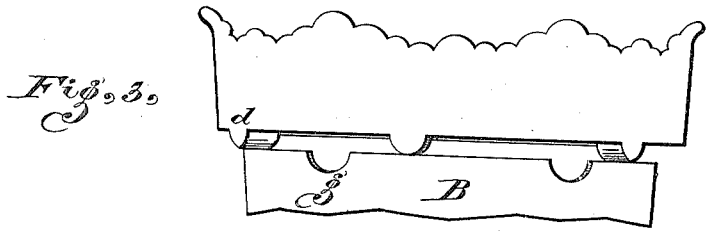
Figure 4:
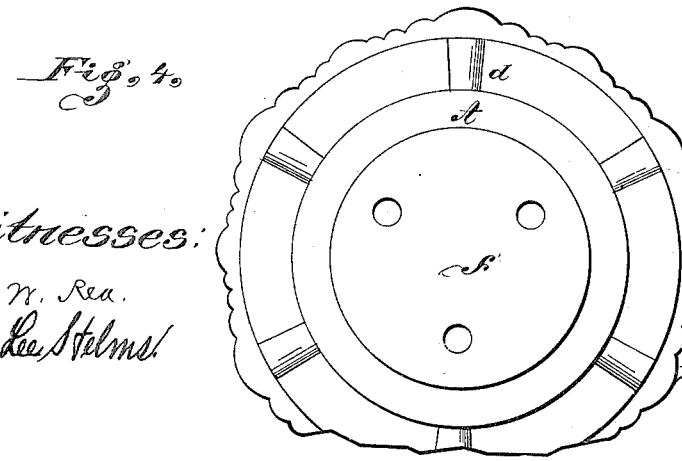

In the accompanying drawings, Figure 1 represents a vertical section of a double flower-pot according to this invention, while Fig. 2 represents the top of the pot when closed and Fig. 3 when open. Fig. 4 shows the inner pot as seen from below.

The pot A, intended to hold the plant, is unglazed and porous up to its upper part C and enters freely into the outer part B. The upper part C is flanged and of greater diameter than the top of the outer pot, and the flanged top is provided on its under side with ribs or projections $d$, the number of which may vary according to the size of the pot. The pot B is provided with corresponding recesses in its edge.

If the pot A is so placed on the outer pot B that the ribs $d$ of the former rest upon the upper edge of the latter—*i. e.*, not in the recesses $g$—air will be freely supplied to the inner pot, which supply, however, can be cut off by turning the pot A so that its ribs $d$ pass into the recesses $g$ of the outer pot, thereby closing the opening between the two pots.

The outer pot is provided in the known manner with overflow spouts or openings $h\,i$, which can be closed when required, so as to be able to adjust the level of the water contained in the pot B without lifting the inner pot.

Having now particularly described and ascertained the nature of my said invention and in what manner the same is to be performed, I declare that what I claim is—

1. A two-part flower-pot comprising two pots, one fitting within the other to provide an intermediate concentric space, one of said pots being provided with a series of recesses, and the other with a corresponding series of ribs or projections adapted to seat within said recesses when in one position but arranged to be supported at points intermediate the recesses when in another position, whereby a space is provided between the two pots when in the said latter-named position which leads to the said concentric space, substantially as described.

2. A two-part flower-pot comprising two pots one fitting within the other to provide an intermediate concentric space between them, the said outer pot being provided with a series of recesses at its upper edge, and the inner pot being provided with an annular flange with ribs or projections on its under side corresponding to the recesses in the outer pot, said ribs or projections being arranged to seat within the said recesses when in one position but adapted to be supported at points intermediate said recesses when in another position, substantially as and for the purpose described.

In testimony whereof I have hereunto set my hand in presence of two subscribing witnesses.

HUGO LONITZ.

Witnesses:
   GEORGE H. MURPHY,
   WILLIAM EGGELING.